May 25, 1954 J. D. WALKER 2,679,319
APPARATUS FOR BACKFLUSHING SECTIONAL FILTERS
Filed Dec. 20, 1951 2 Sheets-Sheet 1

INVENTOR.
James Donald Walker,
BY
Louis Robertson
Atty

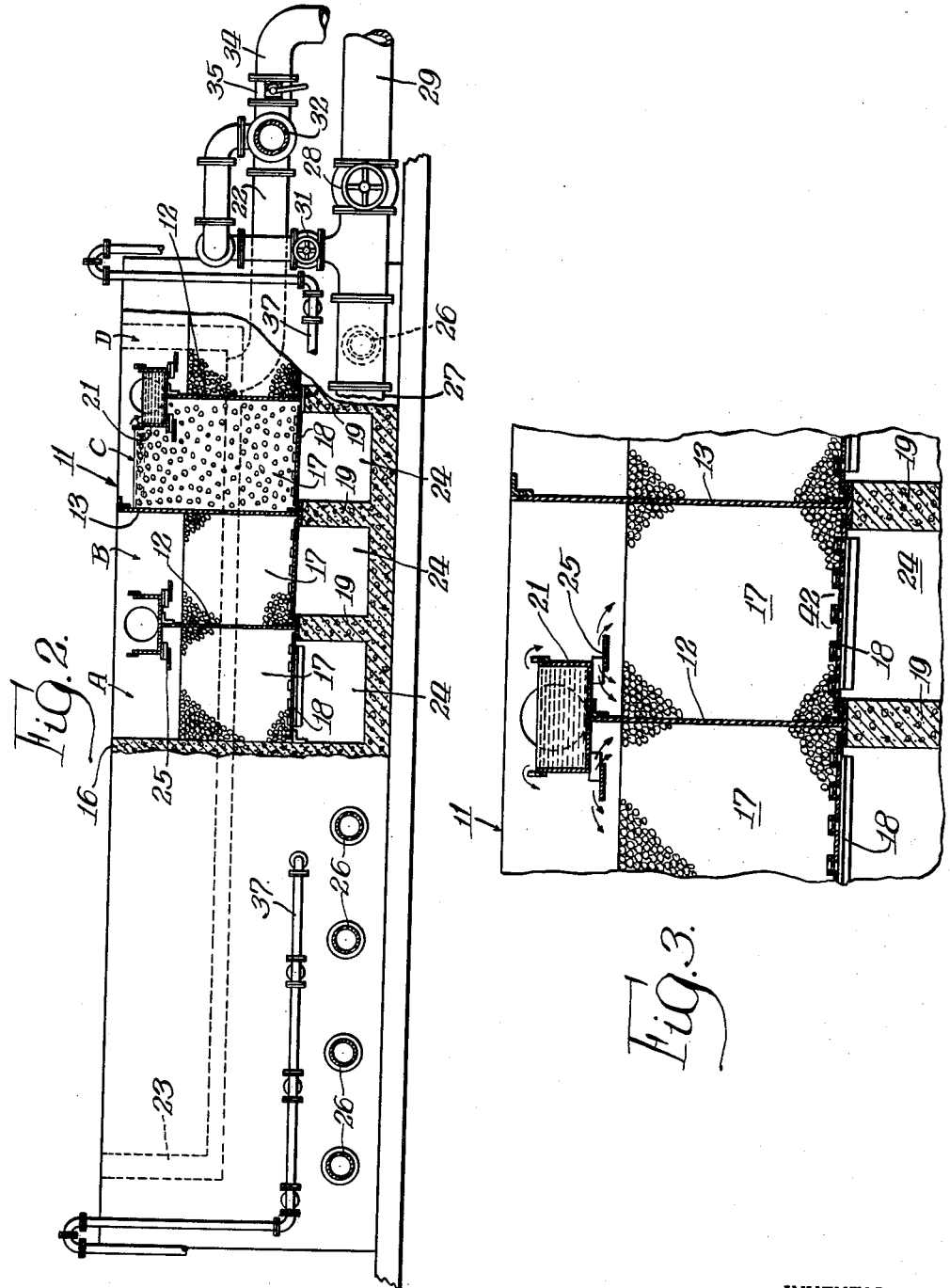

Patented May 25, 1954

2,679,319

UNITED STATES PATENT OFFICE 2,679,319

APPARATUS FOR BACKFLUSHING SECTIONAL FILTERS

James Donald Walker, Aurora, Ill., assignor to Walker Process Equipment Inc., Aurora, Ill., a corporation of Illinois Application December 20, 1951, Serial No. 262,543

4 Claims. (Cl. 210—130)

Backwashing of filters has been common for many years. The backwash water is introduced at the bottom of the filter and passes upwardly through the filter at a sufficient rate to expand the bed of filter material, separating the particles thereof so that any material caught within the filter bed may be washed out. It is apparent that such backwashing requires a high rate of flow, especially in filters, such as those for iron removal, using fairly large media. Generally the rate of normal flow through the filters is not nearly this high. Special and relatively expensive facilities have been provided heretofore to accomplish the backwashing at a higher rate of flow than is available from the normal source of water supply applied to the filter during filtering.

According to the present invention, the provision of such expensive facilities has been made unnecessary by separating the filter into sections and providing quick opening valves, for concentrating into one section at a time all of the flow available, which would otherwise be divided between the several sections. Although butterfly valves tend to leak enough so that they would not be acceptable for most purposes in a water system, they are not only acceptable for the present purpose but are preferred because of their ease and speed of operation.

This concentration of the available flow into a small part of a filter permits exceptionally effective backwashing. For example, in iron removal filters, the backwash flow can be rapid enough to wash out sand. This incidentally makes practical the omission of separate sand traps.

Additional objects and advantages of the invention will be apparent from the following description and from the drawings.

Designation of figures

Figure 2 is a vertical sectional view taken approximately along the irregular line 2—2 of Fig. 1.

Figure 3 is a fragmentary vertical sectional view on an enlarged scale showing a vertical sectional view of parts of one of the filter sections.

Figure 1:
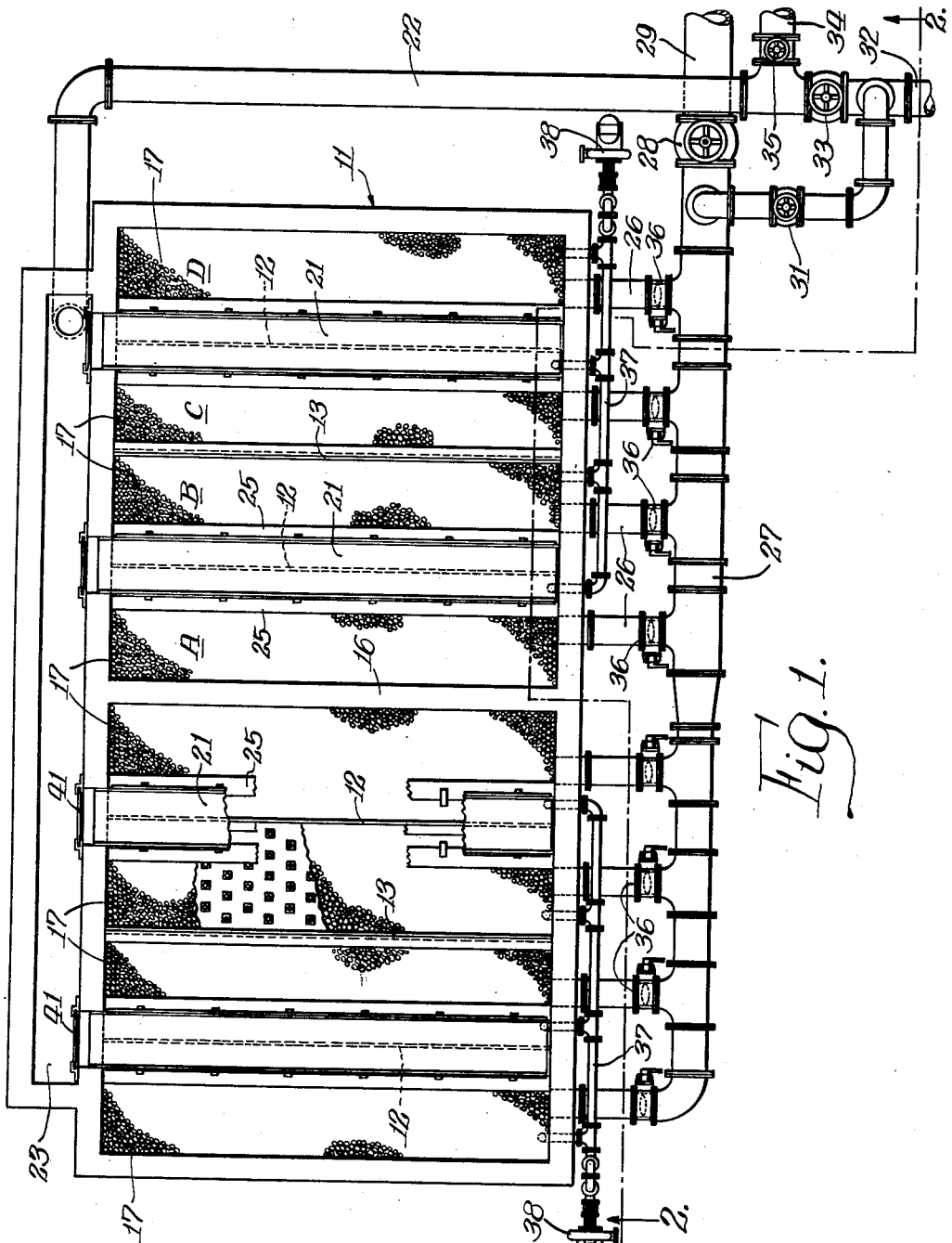
Figure 1 is a view, partly broken away, looking down on one form of apparatus chosen for illustration of the invention.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General description

The apparatus chosen for illustration of the invention includes a tank 11. As seen best in Fig. 2, tank 11 may have a number of partitions 12 and 13 extending across it and thereby forming separate filter sections A, B, C and D. It is preferred that there be at least three and preferably four such sections in each filter unit. If the tank 11 includes a large number of sections, it may be divided into four section units as by dividing wall 16.

Each filter section includes a bed 17 of discrete particles supported by an underdrain system 18, through which water may pass in either direction. Usually the outer and bottom walls of tank 11 will be formed of Portland cement concrete and in that event upstanding concrete walls 19 will usually be provided. These support and form extensions of partitions 12 and 13 and also cooperate to support the underdrain 18. Combined feed and overflow troughs are preferably provided. If they straddle alternate partitions 12, they may each serve two sections 17, as will be seen. A pipe 22 and a manifold trough 23 serve to conduct raw water to the troughs 21 and backwash water from the troughs 21.

It will be apparent that beneath each of the underdrain systems 18 an underdrain chamber 24 is formed. With each of these chambers a separate pipe 26 communicates. The various pipes 26 (or at least those for one of the four-section filter units) all communicate with a common header pipe 27 which communicates through valve 28 with a treated water outflow pipe 29. The header 27 also communicates through a valve 31 with an inflow pipe 32. The latter also communicates through valve 33 with pipe 22. A drain pipe 34 controlled by a valve 35 connects pipe 22 to the sewer when desired.

Operation during filtering

During filtering, valve 33 is opened and valves 31 and 35 are closed so that water from the supply pipe 32 flows through manifold trough 23 and into the various overflow troughs 21. Thus the water is normally fed onto all of the filter section beds 17 at once. Preferably water overflowing from overflow trough 21 falls onto a splash plate 26 from which it spreads in both directions to be spread over most of the filter beds. The water trickles through the filter beds 17 and through the underdrain systems 18 into the underdrain chambers 24. From there the water flows through the various pipes 26 into the header 27, the various intervening valves 36 being open. The valve 28 being open, the water flows through header 27, through outflow pipe 29 for use or storage.

It is preferred to maintain a sub-atmospheric air pressure in the underdrain chambers 24. This can be done by suction pipes 37 connected to suitable blowers 38. This sub-atmospheric pressure draws air down through the filter for better functioning of the filter.

Backflushing operation

For the purpose of backflushing, valves 33 and 28 are closed and valves 35 and 31 are opened. Also, most or all but one of the valves 36 will be closed. The entire supply of raw water thereby becomes available for backflushing the one filter section whose valve 36 is left open. As indicated in Fig. 2, this will cause water to flow up through the under-drain system of one section at a rapid enough rate to cause thorough expansion of the filter bed 17 of that section. In the well-recognized manner, this expansion separates the particles of the bed and facilitates cleaning of the bed. In the case of iron removal filters, where fairly large particles are used, the water flow may even be sufficient to wash sand from the bed. Such sand and all other foreign material collected on the particles of bed 17 wash over the side of overflow trough 21 and into trough 21. From there the water flows into manifold trough 23 and through pipe 22 and valve 35 to sewer pipe 34.

The valves 36 are preferably quick-acting valves such as butterfly valves. The operator may therefore observe the condition of the section being backwashed, close its valve 36 as soon as the overflow appears clean, and open the valve 36 of the next section. In this manner he may wash all of the sections in a very short time. When all of the sections have been backwashed, the valve 31 will be closed. If desired, another valve may connect header 27 with the sewer to drain the backwash water and possibly to drain the first water run through the filter in the normal direction.

In almost all instances the outflow pipe 29 will deliver water to a storage tank of some sort, Accordingly, there is ordinarily no objection to shutting off delivery of water through that pipe for a reasonable time. In the event there should be any objection, the various connections for the two filter units may be made independently so that all of the filter units may be kept in operation except the one which is being backwashed. However, in the one which is being backwashed, there should be at least three and preferably four sections so that the entire flow of water normally available to this multiple section unit may be applied for backwashing one section. Of course all danger of excessive flow in backwashing may be avoided by the setting of the valve 31 or the valves 36. The common inflow or supply pipe 32 is usually connected to a centrifugal pump or other source of relatively constant pressure, so that reducing the flow is unobjectionable.

Considering only a four-section filter, reduction of flow by valves is not likely to be desired. The increased head loss may accomplish some flow reduction, and generally a backwash rate is desired at least three times the normal flow. With anthracite media of $\frac{3}{4}$ inch or larger, this high rate backwash may be used to wash fine sand out of the bed, making a separate sand-trap unnecessary.

Flow stops 41, though not normally used, may be provided for shutting off flow to one unit, as during repair.

The present invention is especially useful in connection with filters for removal of iron, manganese, and other metals from well water bearing such metals in solution. Such water is potable so that there is ordinarily no objection to its use for backflushing purposes, as would be the case in using contaminated water for backflushing sand filters.

It is important that the under-drain system be of a type free from apertures so small that the iron or other metal in the water will plate on the surfaces surrounding the aperture to such an extent as to bridge and plug the aperture. In filters of the type mentioned, the under-drain system usually includes a plate having large perforations covered by a screen 42 of a mesh sufficiently fine to support the filter material used. For the purposes of the present invention, it is desirable that the screen be no finer than is necessary for properly supporting the media, more specifically for supporting the $\frac{3}{32}$-inch media, which is the finest desirably used, without its dropping through or jamming in the interstices. Screen with $\frac{1}{8}''$ clear openings has been found to be satisfactory. It is desired that a backwash rate of thirty to forty gallons per minute per square foot be provided.

I claim:

1. A filter including a filter tank, partitions dividing said tank into at least three filter sections, a filter bed in each section, means for applying water to the surfaces of the beds in all of said sections from a common inflow pipe, an outflow pipe, under-drain means for each of said sections beneath the bed therein, a common header pipe comprising the sole means communicating with each of said under-drain means and communicating with the outflow pipe, valve means for shutting off the flow through the outflow pipe, valve means for diverting the inflow from the common inflow pipe to the common header pipe, and a butterfly valve between each of said under-drain means and said common header pipe whereby substantially the entire flow available from the common inflow pipe can be directed into the under-drain means for a single section for high rate backwashing of said section; said tank and partitions extending, free from backflow discharge means, substantially above the level of the top of the bed to provide for expansion of the bed by backwashing.

2. A filter including a filter tank, partitions dividing said tank into at least three filter sections, a filter bed in each section, means for applying water to the surfaces of the beds in all of said sections from a common inflow pipe, an outflow pipe, under-drain means for each of said sections beneath the bed therein, a common header pipe comprising the sole means communicating with each of said under-drain means and communicating with the outflow pipe, valve means for shutting off the flow through the outflow pipe, valve means for diverting the inflow from the common inflow pipe to the common header pipe, and a quick-acting valve between each of said under-drain means and said common header pipe whereby substantially the entire flow available from the common inflow pipe can be directed into the under-drain means for a single section for high rate backwashing of said section; said tank and partitions extending, free from backflow discharge means, substantially above the level of the top of the bed to provide for expansion of the bed by backwashing.

3. A filter including a filter tank, partitions dividing said tank into at least three filter sections, a filter bed in each section, means for applying water to the surfaces of the beds in all of said sections from a common inflow pipe, an outflow pipe, under-drain means for each of said sections beneath the bed therein, a common header pipe comprising the sole means communicating with each of said under-drain means and communicating with the outflow pipe, valve means for shutting off the flow through the outflow pipe, valve means for diverting the inflow from the common inflow pipe to the common header pipe, and a valve between each of said under-drain means and said common header pipe whereby substantially the entire flow available from the common inflow pipe can be directed into the under-drain means for a single section for high rate backwashing of said section; said tank and partitions extending, free from backflow discharge means, substantially above the level of the top of the bed to provide for expansion of the bed by backwashing.

4. Filtering apparatus including a plurality of filter sections, a filter bed in each section, means for applying water to the surfaces of the beds in all of said sections from a common inflow pipe, an outflow pipe, under-drain means for each of said sections beneath the bed therein, a common header pipe comprising the sole means communicating with each of said under-drain means and communicating with the outflow pipe, valve means for shutting off the flow through the outflow pipe, valve means for diverting the inflow from the common inflow pipe to the common header pipe, and a quick-acting valve between each of said under-drain means and said common header pipe whereby substantially the entire flow available from the common inflow pipe can be directed into the under-drain means for a single section for high rate backwashing of said section; said tank and partitions extending, free from backflow discharge means, substantially above the level of the top of the bed to provide for expansion of the bed by backwashing.

References Cited in the file of this patent

UNITED STATES PATENTS

| Number | Name | Date |
|---|---|---|
| 647,780 | Wilson | Apr. 17, 1900 |
| 768,014 | Marsh | Aug. 16, 1904 |
| 1,331,732 | Wait | Feb. 24, 1920 |
| 1,870,321 | Adelson | Aug. 9, 1932 |
| 2,129,181 | Morse | Sept. 6, 1938 |
| 2,204,225 | Merckel | June 11, 1940 |

FOREIGN PATENTS

| Number | Country | Date |
|---|---|---|
| 19,220 | Great Britain | 1890 |